(12) United States Patent
Nola

(10) Patent No.: US 10,100,791 B2
(45) Date of Patent: Oct. 16, 2018

(54) INTAKE MANIFOLD WATER MANAGEMENT NEGATIVE DRAFT CONTAINMENT FEATURES

(71) Applicant: Ford Global Technologies, LLC, Dearborn, MI (US)

(72) Inventor: Gary Nola, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 14/996,708

(22) Filed: Jan. 15, 2016

(65) Prior Publication Data
US 2017/0204817 A1    Jul. 20, 2017

(51) Int. Cl.
*F02M 35/10*    (2006.01)
*F02M 35/104*    (2006.01)

(52) U.S. Cl.
CPC .... *F02M 35/10052* (2013.01); *F02M 35/104* (2013.01); *F02M 35/10262* (2013.01); *F02M 35/10321* (2013.01)

(58) Field of Classification Search
CPC ....... F02M 35/10052; F02M 35/10262; F02M 35/1011; F02M 35/10091; F02M 35/10131; F02M 35/104; F02M 35/088; F02M 35/10072; F02B 29/04
USPC .......... 123/184.24, 184.42, 184.34, 123/184.47–184.51
See application file for complete search history.

(56) References Cited

U.S. PATENT DOCUMENTS

| | | | | |
|---|---|---|---|---|
| 3,250,263 A | * | 5/1966 | Gerjets | F01M 13/04 123/573 |
| 3,329,267 A | * | 7/1967 | Millhiser | B24C 9/006 209/210 |
| 9,179,470 B2 | * | 11/2015 | Gulati | H04B 1/44 |
| 2011/0232598 A1 | * | 9/2011 | Harada | F02M 29/00 123/184.47 |
| 2014/0165948 A1 | * | 6/2014 | Sekiguchi | F02M 35/10 123/184.21 |

FOREIGN PATENT DOCUMENTS

| | | |
|---|---|---|
| CN | 2077030 | 5/1991 |
| JP | 2004124831 | 4/2004 |
| JP | 2014077366 | 5/2014 |

* cited by examiner

*Primary Examiner* — Syed O Hasan
(74) *Attorney, Agent, or Firm* — LeClairRyan

(57) ABSTRACT

A method and a system to eliminate the flow of accumulated liquid water from the intake manifold into the cylinders of an internal combustion engine are disclosed. Particularly, the disclosed inventive concept provides a negative draft to the top of a water containment feature in the form of opposed baffles. The baffles increase the minimum angle the water has to reach to overflow out of the intake manifold and into the cylinders. The angle required to overflow is a composition of gravity and the acceleration of the vehicle. If the maximum acceleration (and thus maximum water angle) is less than the designed negative draft overflow protection, there will not be expected overflow. The water containment reservoir includes two opposed side walls, a front wall, a back wall, and a base. Each side wall has an upper end. The baffle extends from the upper end of at least one side wall.

17 Claims, 3 Drawing Sheets

INTAKE MANIFOLD WATER MANAGEMENT NEGATIVE DRAFT CONTAINMENT FEATURES

TECHNICAL FIELD

The disclosed inventive concept relates to an intake manifold for an internal combustion engine. More particularly, the disclosed inventive concept relates to a method and system to eliminate the flow of accumulated liquid water from the intake manifold into the cylinders of an internal combustion engine. The disclosed method and system incorporates a water management cavity formed in the base of the intake manifold. The water management cavity includes negative draft baffles positioned over the accumulated water.

BACKGROUND OF THE INVENTION

The intake manifold of a running internal combustion engine generally operates under negative pressure by which an air-fuel mixture is drawn through the intake manifold and into the cylinders. Because of the pressure differential between the intake manifold and ambient air, it is possible for liquid water to enter and accumulate in the intake manifold. An example of such a situation arises where the vehicle is passed through deep standing water. Another example of such a situation arises during times of excessive rain.

If even a small amount of accumulated liquid water enters one or more of the cylinders, an engine misfire can result. The entry of liquid water into the engine may also cause the failure of one or more sensors, such as the throttle position sensor, as some sensors are sensitive to the presence of water. If a larger amount of water enters a cylinder, engine damage in the form of a bent or broken connecting rod may result. This is the case because liquid water is not compressible, and when the piston moves toward the top of the combustion chamber during the compression stroke, even a small amount of liquid water can provide sufficient non-compressive mass to resist the free movement of the piston.

In an effort to restrict the inflow of liquid water from the intake manifold into the cylinders, water containment features have been introduced into the lower portion of the manifold. However, known containment features still allow liquid water to enter the cylinders, thus causing misfiring, sensor failure, and engine damage as noted above.

Accordingly, as in so many areas of vehicle technology there is room for improvement related to methods and systems for restricting the flow of liquid water from the intake manifold into the cylinders of an internal combustion engine.

SUMMARY OF THE INVENTION

The disclosed inventive concept overcomes the problems associated with known methods and systems for minimizing or eliminating the passage of liquid water from the intake manifold into the cylinders of an internal combustion engine. Particularly, the disclosed inventive concept provides a negative draft to the top of a water containment feature in the form of one or more baffles. The baffle increases the minimum angle the water has to reach to overflow into one or more cylinders. The angle required to overflow is a composition of gravity and the acceleration of the vehicle. If the maximum acceleration (and thus maximum water angle) is less than the designed negative draft overflow protection, then there will not be expected overflow.

The disclosed inventive concept provides a method and system for an internal combustion engine that includes an intake manifold having a manifold body with an interior plenum. Intake runners extend from the body and are in fluid communication with the interior plenum.

The body of the intake manifold includes a lower end that incorporates a water containment feature. The water containment feature includes a water containment reservoir having a substantially open upper portion and a water-restricting baffle positioned substantially over the upper portion.

The water containment reservoir includes a pair of opposed side walls, a front wall, a back wall, and a base. Each side wall has an upper end. Each baffle extends from the upper end of at least one side wall. Each baffle preferably is sloped at a downward angle from the upper end of the side wall. Preferably there are two opposing baffles.

The intake manifold body may be a single piece or may be two separately-formed but attached components including an upper manifold portion to which the water containment reservoir is attached. The baffle may be integrally formed with the upper manifold portion. The manifold body may be made of a variety of materials but is preferably formed from molded plastic.

The length, number and angle of the baffles may be selectively adjusted thus making the system of the disclosed inventive concept tunable. In addition, the size and shape of the water containment reservoir may be selectively adjusted thus making the system of the disclosed inventive concept more tunable. For example, the deeper the water containment reservoir, the less likely that water will flow from the intake manifold into the cylinders.

By adjusting these variables, particularly as to the baffles, the air-fuel mixture flow pattern may also be adjusted such that the intake manifold not only restricts water flow but also delivers an in-cylinder flow pattern that improves combustion efficiencies and thus improves fuel economy.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
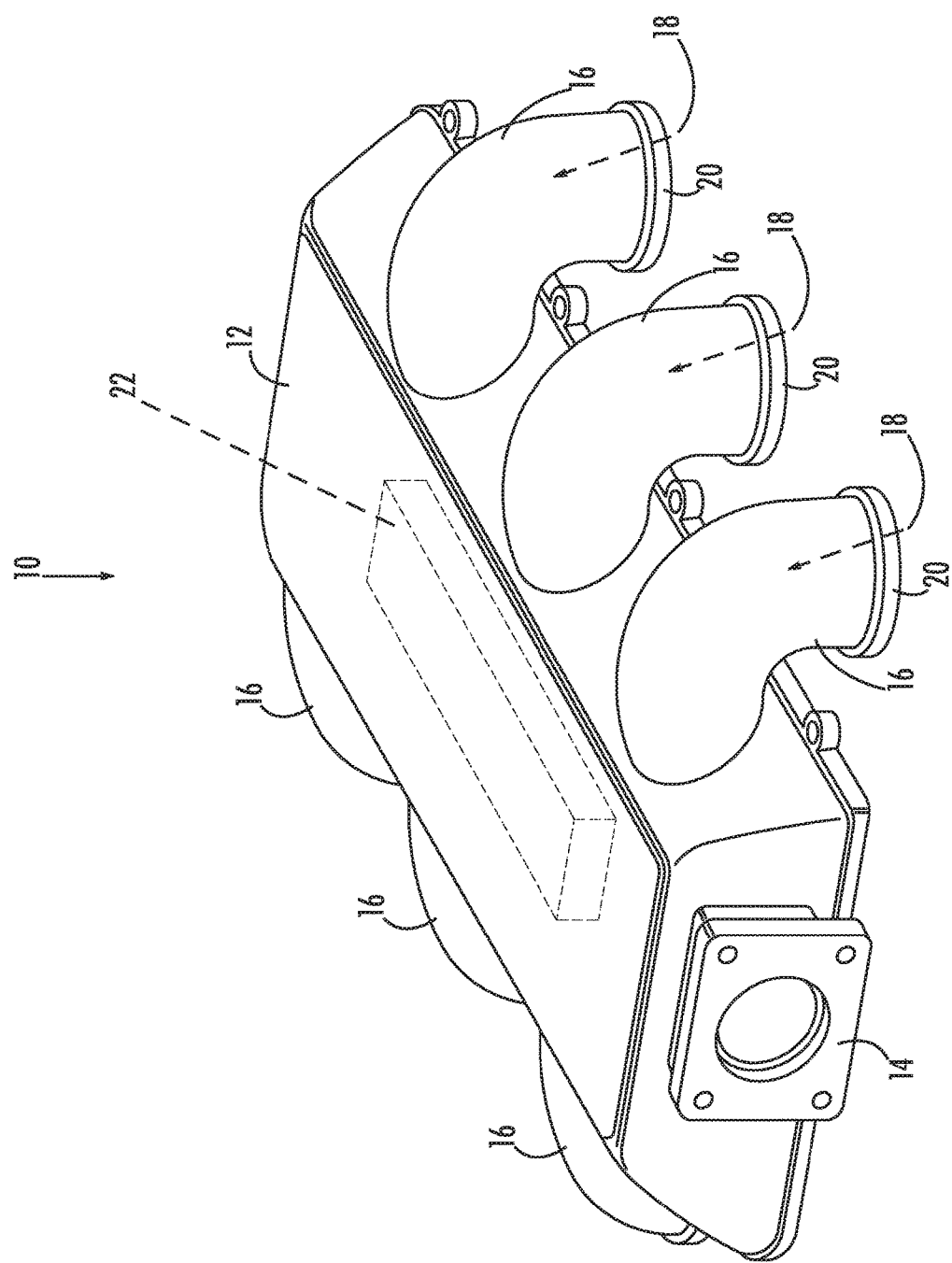
FIG. 1 illustrates a perspective view of an intake manifold for an internal combustion engine illustrating a water containment feature shown in broken lines.

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a method and system that restricts or eliminates the passage of liquid water from the intake manifold into the cylinders of an internal combustion engine. In general, the intake manifold according to the disclosed inventive concept provides a negative draft to the top of a water containment feature. The negative draft is specifically provided in the form of a baffle. The baffle increases the minimum angle the water has to reach to overflow. The angle required to overflow is a composition of gravity and the acceleration of the vehicle. If the maximum acceleration (and thus maximum water angle) is less than the designed negative draft overflow protection, then there will not be expected overflow. Importantly, the disclosed inventive concept accomplishes the objective of restricting or eliminating the flow of liquid water into the cylinders of the engine while at the same time meeting engine system functional requirements.

Referring to FIG. 1, an intake manifold 10 according to the disclosed inventive concept is illustrated. The intake manifold 10 includes a manifold body 12 having an air-fuel intake flange 14 formed thereon. An air-fuel mixing device, such as a throttle body (not shown), is attached to the air-fuel intake flange 14.

The intake manifold 10 includes a plurality of runners 16. Each of the runners 16 extends outward from the manifold body 12. Within each runner 16 is an air-fuel passage 18. Each air-fuel passage 18 is in fluid communication at one end with the body 12 of the intake manifold 10 and at another end 20 with an outlet port. When the intake manifold 10 is attached to an engine, each outlet port is placed in communication with a respective engine cylinder port.

A water containment feature is integrally provided with the intake manifold 10. Particularly, a water management cavity 22 is formed in the base of the intake manifold 10. The water management cavity 22 is shown in broken lines in FIG. 1.

Figure 2:
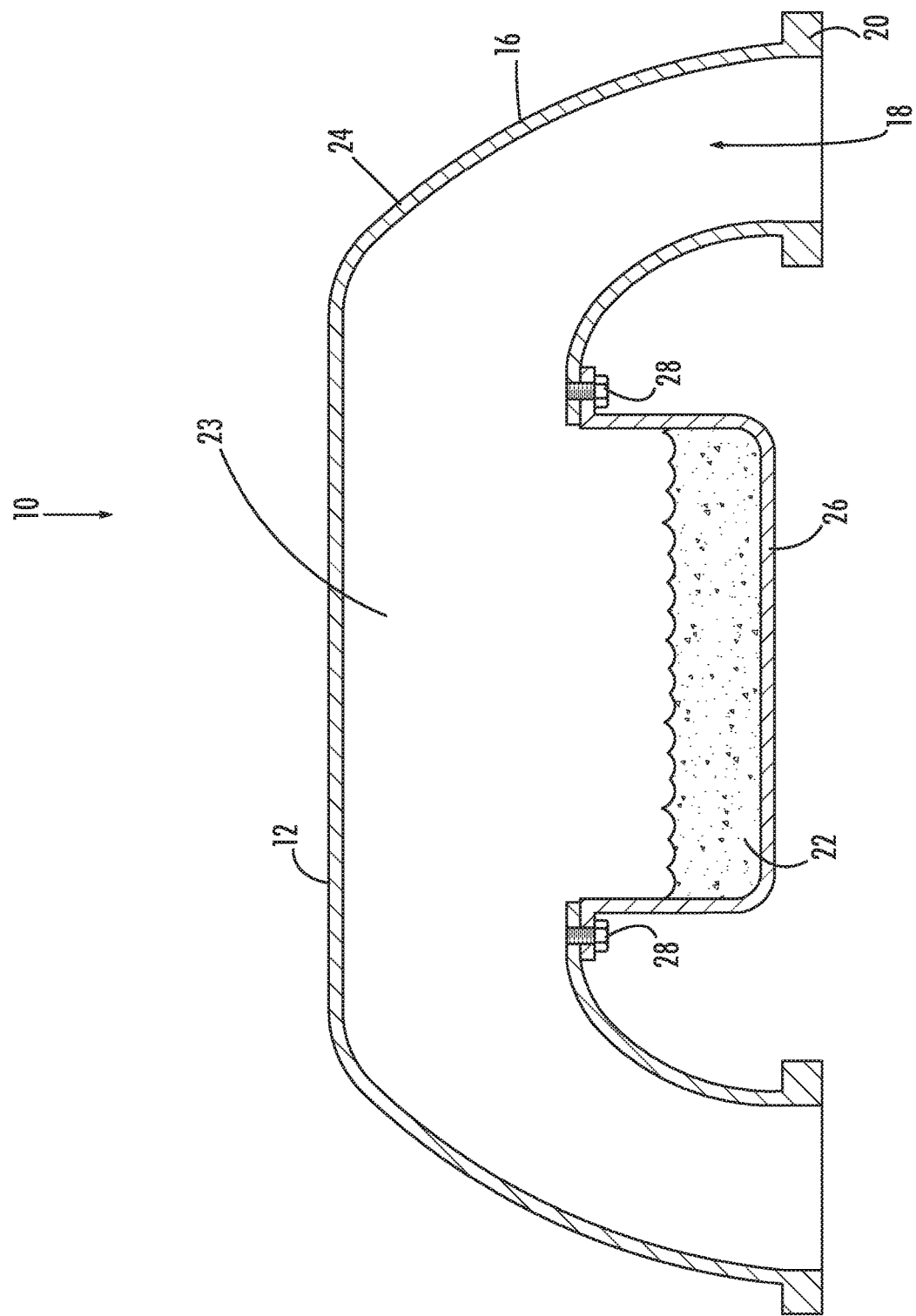
FIG. 2 illustrates a sectional view of an intake manifold according to a first embodiment of the disclosed inventive concept.

FIG. 2 illustrates a sectional view of the intake manifold 10. The intake manifold 10 may be composed of any one of a variety of materials including, but not limited to, a rigid plastic. Formed within the manifold body 12 is a plenum 23. The manifold body 12 of the intake manifold 10 may be of one-piece construction or may be formed from two separate portions as illustrated. The portions include an upper body portion 24 and a water containment reservoir 26. The water containment reservoir 26 defines the water management cavity 22.

If formed from separate components, the water containment reservoir 26 is attached to the upper body portion 24 by any of a variety of methods. Methods of attachment include, without limitation, plastic welding, adhesive bonding or, as illustrated herein, mechanical fastening in the form of mechanical fasteners 28.

The size and shape of the water containment reservoir 26 may be selectively adjusted thus making the system of the disclosed inventive concept highly tunable. For example, the deeper the water containment reservoir 26, the less likely that water will flow from the intake manifold 10 into the cylinders. However, the depth of the water containment reservoir 26 must be balanced against the increased space required for an intake manifold having a deeper base.

Figure 3:
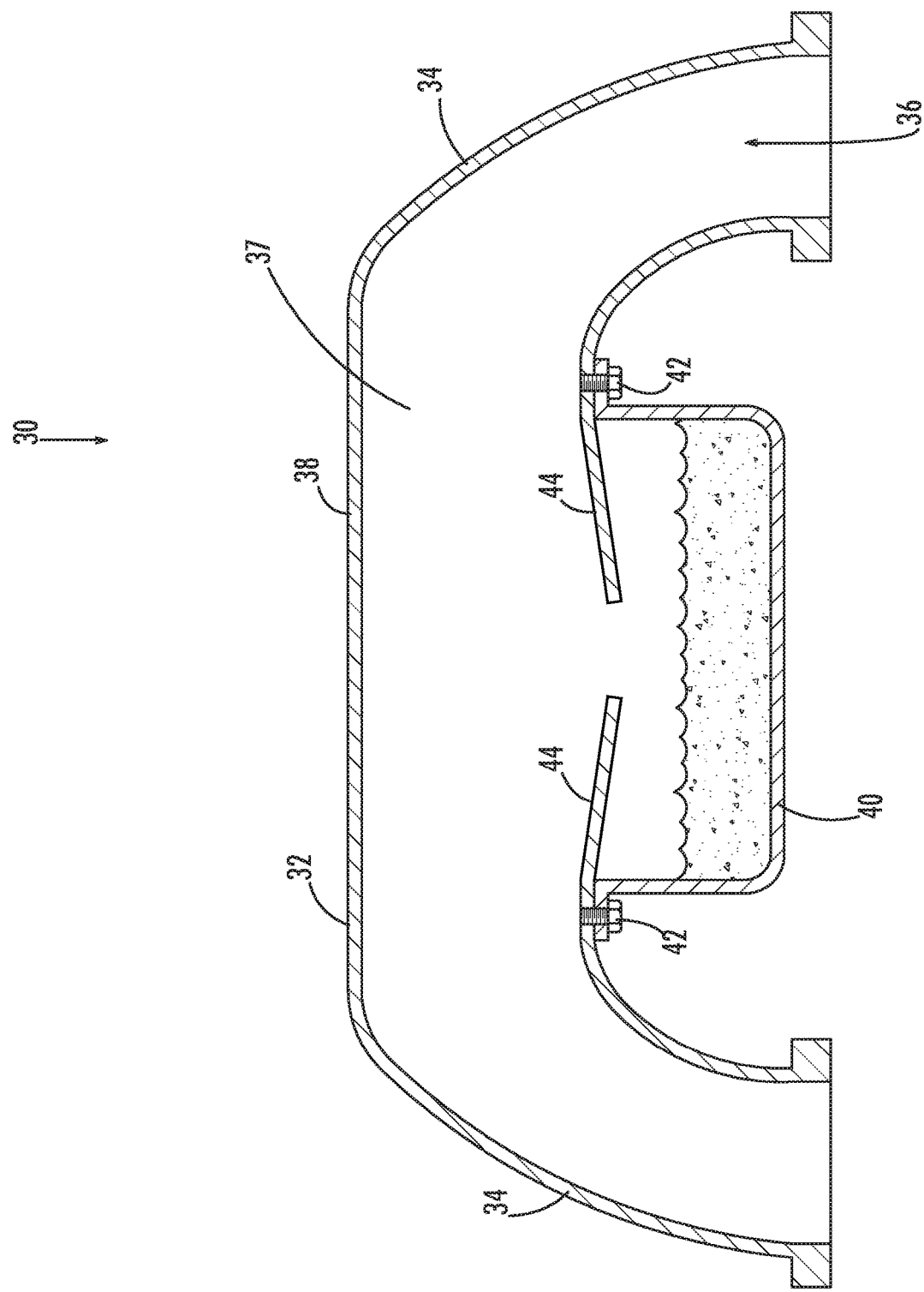
FIG. 3 illustrates a sectional view of an intake manifold according to a second embodiment of the disclosed inventive concept.

An alternate arrangement of the water containment feature of the disclosed inventive concept is illustrated in FIG. 3 in which a sectional view of an intake manifold according to a second embodiment of the disclosed inventive concept is shown. Particularly, and referring to FIG. 3, an intake manifold 30 is illustrated. The intake manifold 30 includes a manifold body 32 having a plurality of runners 34. Each of the runners 34 extends outward from the manifold body 32. Within each of the runner 34 is an air-fuel passage 36. Formed within the manifold body 32 is a plenum 37.

Like the intake manifold 10 discussed above, the intake manifold 30 may be composed of any one of a variety of materials including, but not limited to, a rigid, molded plastic. The body 32 of the intake manifold 30 is preferably composed of two portions which, as illustrated, may be separate components. The portions include an upper body portion 38 and a water containment reservoir 40.

If formed from separate components, the water containment reservoir 40 is attached to the upper body portion 38 by any of a variety of methods. Such methods include, without limitation, plastic welding, adhesive bonding or, as illustrated herein, mechanical fastening in the form of mechanical fasteners 42.

The intake manifold 30 of FIG. 3 includes baffles 44 provided over the water containment reservoir 40. The baffles 44 are preferably sloped at a downward angle as illustrated in FIG. 3 to enhance their water outflow-restricting function. The baffles 44 may be integrally formed as part of the upper body 38 as illustrated or may be formed separately. If formed separately, the baffles 44 may be captured between the upper body 38 and the water containment reservoir 40. As noted above, the baffles 44 increase the minimum angle the water has to reach to overflow. The angle required to overflow can be adjusted as it is a composition of gravity and the acceleration of the vehicle. If the maximum acceleration (and thus maximum water angle) is less than the designed negative draft overflow protection, then there will not be expected overflow.

The length, number and angle of the baffles 44 as well as the size and shape of the water containment reservoir 40 may be selectively adjusted thus making the system of the disclosed inventive concept highly tunable. By adjusting these variables, particularly as to the baffles 44, the air-fuel mixture flow pattern may also be adjusted such that the intake manifold 30 not only restricts water flow but also delivers an in-cylinder flow pattern that improves combustion efficiencies and thus improves fuel economy.

The disclosed invention as set forth above overcomes the challenges faced by designers seeking to restrict or eliminate the flow of liquid water from the intake manifold into one or more cylinders of an internal combustion engine. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An intake manifold for an internal combustion engine comprising: a manifold body having an interior plenum, said interior plenum having a lower end; a water containment feature associated with said manifold body, said water containment feature including a water containment reservoir having a substantially open upper portion, a pair of opposed side walls, a front wall, a back wall, and a base, said pair of opposed side walls having an upper end; and a water-restricting baffle positioned substantially over said upper portion for separating liquid water from an air-fuel mixture flowing through said manifold body, said water-restricting baffle being attached to said upper end of a side wall of said pair of opposed side walls and sloping downward therefrom at an angle relative to said base.

2. The intake manifold of claim 1 wherein said manifold body includes an upper manifold portion to which said water containment reservoir is attached.

3. The intake manifold of claim 2 wherein said water-restricting baffle is integrally formed with said upper manifold portion.

4. The intake manifold of claim 1 wherein said manifold body is formed from molded plastic.

5. An intake manifold for an internal combustion engine comprising: a manifold body having an interior plenum, said interior plenum having a lower end; a water containment feature associated with said manifold body, said water containment feature comprising a water containment reservoir having a substantially open upper portion and a side wall having an upper end; and a pair of water-restricting baffles positioned substantially over said upper portion, each water-restricting baffle of said pair of water-restricting baffles being attached to said upper end of said side wall and sloping downward therefrom toward one another.

6. The intake manifold of claim 5 wherein said manifold body includes an upper manifold portion to which said water containment reservoir is attached.

7. The intake manifold of claim 6 wherein each water-restricting baffle of said pair of water-restricting baffles is integrally formed with said upper manifold portion.

8. The intake manifold of claim 5 wherein said water containment reservoir includes a base and each water-restricting baffle of said pair of water-restricting baffles is sloped at an angle relative to said base.

9. The intake manifold of claim 5 wherein said manifold body is formed from molded plastic.

10. An intake manifold for an internal combustion engine comprising: a manifold body having an interior plenum having a lower end; a water containment reservoir formed in said lower end, said water containment reservoir having a side wall and an upper end; and a pair of water-restricting baffles positioned at said upper end of said water containment reservoir, each baffle of said pair of water-restricting baffles being attached to said upper end of said side wall, directed toward one another, and sloping downward from said upper end, each water-restricting baffle of said pair of water-restricting baffles being symmetrical and defining a central channel between a free end of each water-restricting baffle of said pair of water-restricting baffles.

11. The intake manifold of claim 10 wherein said manifold body includes an upper manifold portion to which said water containment reservoir is attached.

12. The intake manifold of claim 11 wherein each water-restricting baffle of said pair of water-restricting baffles is integrally formed with said upper manifold portion.

13. The intake manifold of claim 10 wherein said water containment reservoir is defined by a pair of opposed side walls, a front wall, a back wall, and a base.

14. The intake manifold of claim 10 wherein said water containment reservoir includes a base and each water-restricting baffle of said pair of water-restricting baffles is sloped at an angle relative to said base.

15. The intake manifold of claim 10 wherein said manifold body is formed from molded plastic.

16. The intake manifold of claim 10 wherein said manifold body is formed from molded plastic.

17. The intake manifold of claim 10 wherein said water containment reservoir includes a base and each water-restricting baffle of said pair of water-restricting baffles is sloped at an angle relative to said base.

* * * * *